(12) United States Patent
Wong et al.

(10) Patent No.: US 8,239,370 B2
(45) Date of Patent: Aug. 7, 2012

(54) BASING SEARCH RESULTS ON METADATA OF PRIOR RESULTS

(75) Inventors: Sandy Wong, Seattle, WA (US); Scott Grosenick, Seattle, WA (US); George Johnston, Bellevue, WA (US); Mikhail Mikhailov, Sammamish, WA (US); Srinivas Bobba, Bellevue, WA (US); Jigar Mody, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 595 days.

(21) Appl. No.: 12/147,827

(22) Filed: Jun. 27, 2008

(65) Prior Publication Data

US 2009/0327267 A1 Dec. 31, 2009

(51) Int. Cl.
*G06F 7/00* (2006.01)
(52) U.S. Cl. ....................................................... 707/713
(58) Field of Classification Search .................... 707/713
See application file for complete search history.

(56) References Cited

U.S. PATENT DOCUMENTS

| | | |
|---|---|---|
| 7,158,966 B2 | 1/2007 | Brill |
| 2006/0136403 A1 | 6/2006 | Koo |
| 2007/0118514 A1 | 5/2007 | Mariappan |
| 2007/0136264 A1 | 6/2007 | Tran |
| 2007/0136457 A1 | 6/2007 | Dai |
| 2007/0185865 A1 | 8/2007 | Budzik |
| 2007/0239734 A1* | 10/2007 | Arellanes et al. ............... 707/10 |
| 2007/0266025 A1 | 11/2007 | Wagner |
| 2007/0276807 A1 | 11/2007 | Chen |
| 2007/0294240 A1 | 12/2007 | Steele |
| 2008/0005079 A1 | 1/2008 | Flake |

OTHER PUBLICATIONS

Retroactive Answering of Search Queries; http://labs.rightnow.com/colloquium/papers/retroactive_answers.pdf.
Applying Collaborative Filtering Techniques to Movie Search for Better Ranking and Browsing; http://dpennock.com/papers/park-kdd-2007-mad6-personalized-movie-search.pdf.
The Influence of Caption Features on Clickthrough Patterns in Web Search; http://www.mathcs.emory.edu/~eugene/papers/sigir2007captions.pdf.

* cited by examiner

*Primary Examiner* — Etienne Leroux
*Assistant Examiner* — Ajith Jacob
(74) *Attorney, Agent, or Firm* — Shook, Hardy & Bacon L.L.P.

(57) ABSTRACT

Embodiments of the invention provide a method, system, and media for determining search results based on a query. One embodiment of the method includes receiving an initial query, inspecting an initial set of query-related information that is associated with the query, which is the fruit of analyzing aggregated user-interaction data, which includes information related to how users have previously interacted with former search results that were presented in response to the query. This information includes prior metadata associated with the former search results. Embodiments further include presenting an initial set of search results based on the initial set of query-related information, gathering current user-interaction data, and updating the initial set of query-related information based on the current user-interaction data. In this way, an embodiment of the invention helps, among other things, map a semantic meaning of a query to results that bring about a satisfying user experience.

15 Claims, 19 Drawing Sheets

FIG. 6.

REFINE BY

CATEGORY
DIGITAL CAMERAS (2686) — 712
CARRYING CASES (125)
ANALOG & DIGITAL PHONES (305)
TONERS & CARTRIDGES (1327)
LCD TV (126)
LASER & INKJET PRINTERS (174)
MICE / POINTING DEVICES (61)
MULTIFUNCTION PRINTERS (136)
COMPUTERS BATTERIES (457)
ELECTRONICS BATTERIES (527)
SEE MORE CATEGORY RESULTS

SHOP DIRECT AT THESE STORES
ADORAMA (3.00%)
AUDIVIDEOCABIN.COM (3.00%)
BUY.COM (2.00%)
CHEAP OFFICE SUPPLIES (3.50%)
DIGITAL FOTO CLUB (4.00%)
SEARS (2.00%)

—710

-700-

CANON POWERSHOT A460 DIGITAL CAMERA
$104 - $159
AT 6 STORES
COMPARE PRICES

CANON POWERSHOT DIGITAL ELPH SD750 …
$155 - $345
AT 34 STORES
COMPARE PRICES

CANON POWERSHOT DIGITAL CAMERA
$321 - $598
AT 28 STORES
COMPARE PRICES

SONY CYBER-SHOT DSC-W55 DIGITAL CAME…
$165 - $268
AT 4 STORES
COMPARE PRICES

SONY CYBER-SHOT DSC-H7 DIGITAL CAME…
$313 - $416
AT 5 STORES
COMPARE PRICES

SONY CYBER-SHOT DSC-W80 DIGITAL CAM…
$192 - $295
AT 3 STORES
COMPARE PRICES

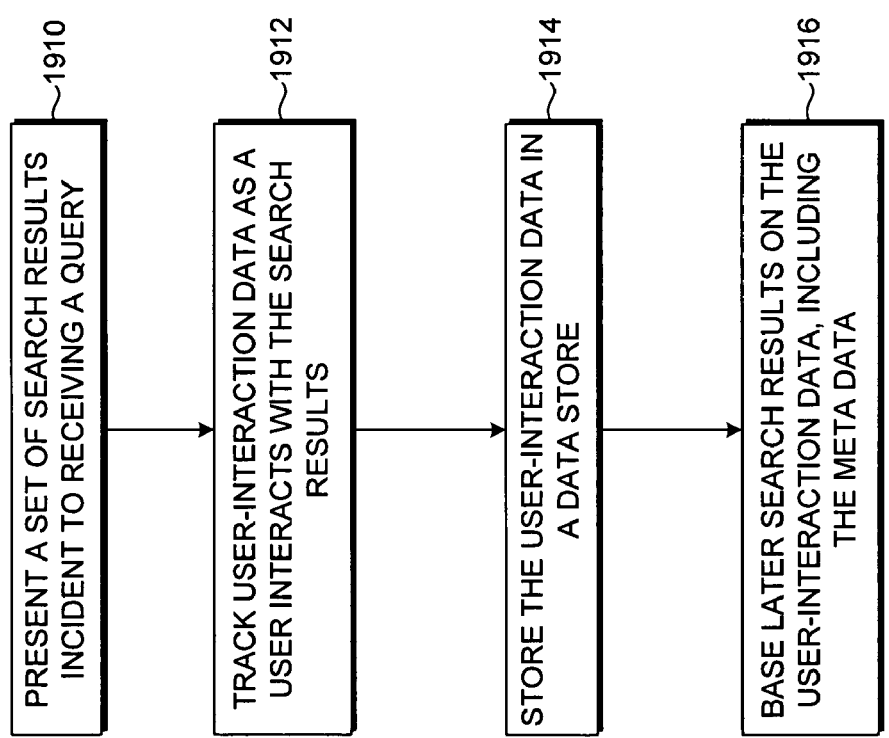

BASING SEARCH RESULTS ON METADATA OF PRIOR RESULTS

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. At a high level, this disclosure describes utilizing metadata that is gathered as a user interacts with search results returned from a query to determine subsequent search results. That is, users' interactions with search results are used in an open-ended manner to influence subsequent search results. In one embodiment, this is accomplished by storing metadata associated with the various returns that a user interacts with, and then using this metadata to condition aspects such as a ranking or a description of subsequent search results.

BRIEF DESCRIPTION OF THE SEVERAL VIEWS OF THE DRAWINGS

Embodiments of the invention are described in detail below with reference to the drawing figures, which form a part of this disclosure, and are incorporated by reference herein, and wherein:

FIGS. 4-12 depict illustrative screenshots of presentations of information as a user interacts with a search query according to an embodiment of the present invention;

FIGS. 18-19 depict two other illustrative methods for determining search results based on a query according to an embodiment of the present invention.

DETAILED DESCRIPTION

Figure 1:
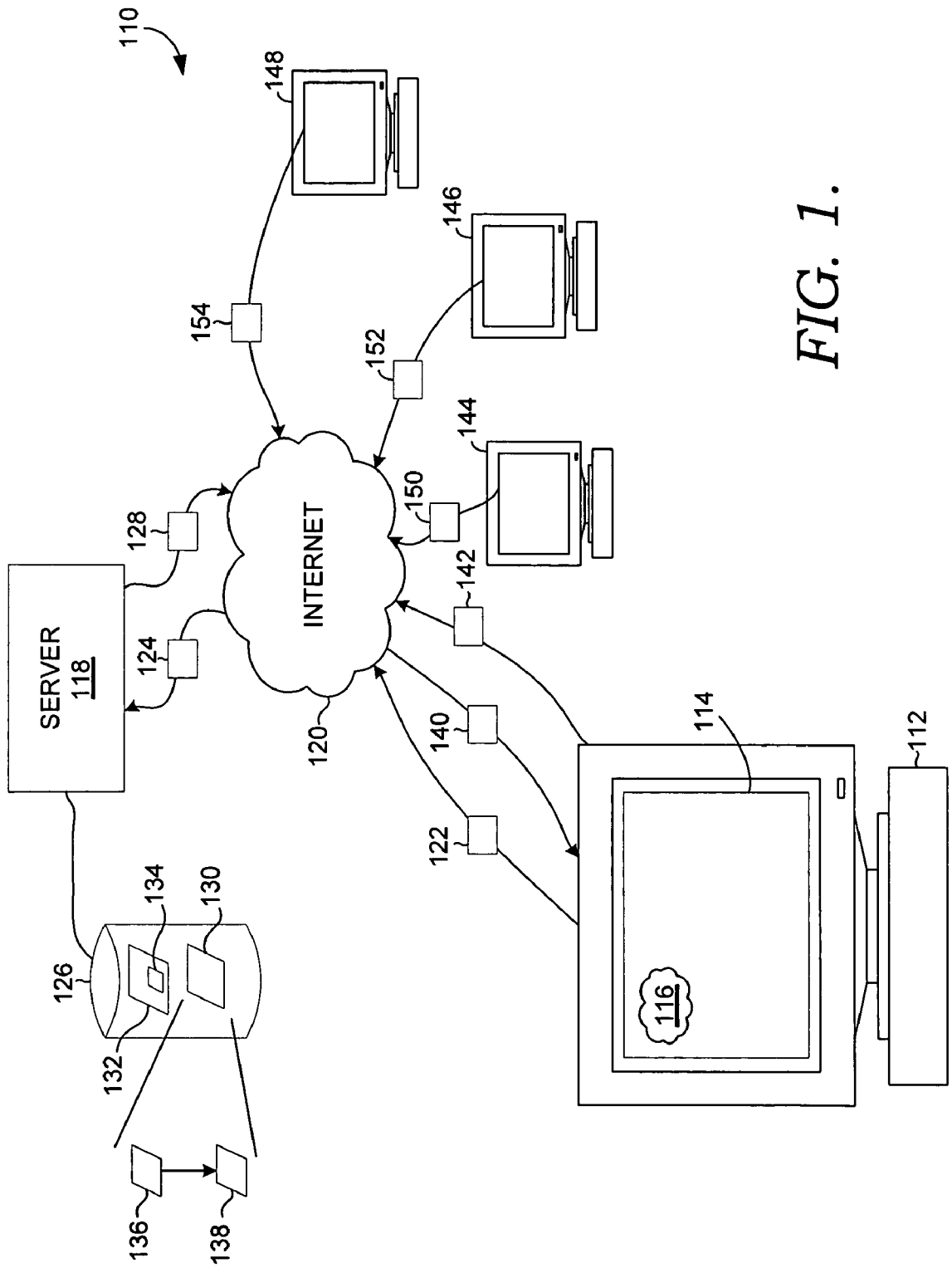
FIG. 1 depicts an illustrative operating environment suitable for practicing an embodiment of the invention.
Figure 2:
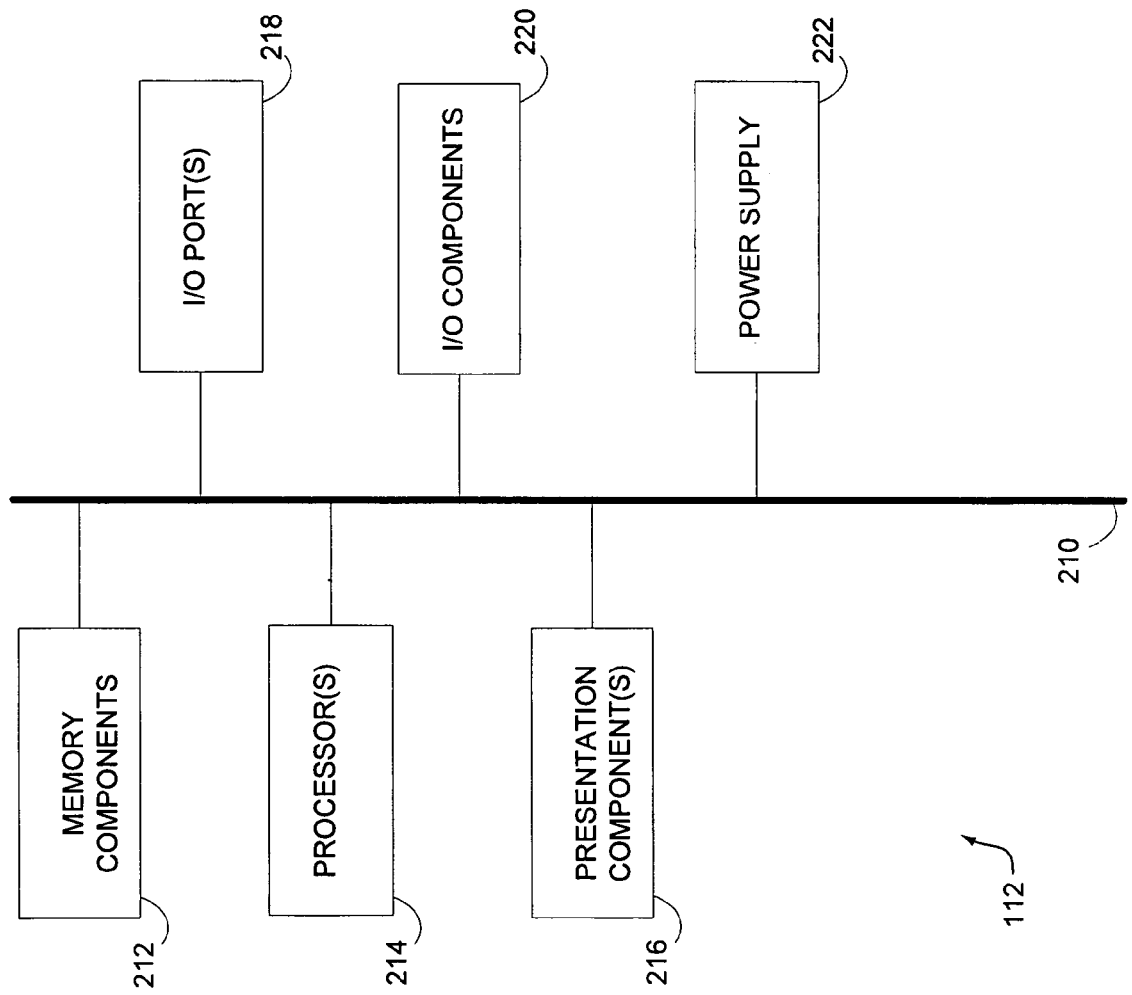
FIG. 2 depicts a block diagram illustrating certain components of an illustrative computing device suitable for practicing an embodiment of the present invention.

With initial reference to FIG. 1, an illustrative operative environment suitable for practicing an embodiment of the invention is provided and referenced generally by the numeral 110. Operating environment 110 includes a computing device 112, which is schematically described in greater detail in connection with FIG. 2, which we will briefly describe to provide a general overview of computing device 112. In FIG. 2, a diagrammatic block diagram of client computing device 112 is provided, which device might take the form of a conventional computer as well as a consumer electronics device, such as an internet-connected watch, mobile phone, and the like. Computing device 112 may take on a variety of forms, including, for example, a computing device such as a gaming console, a client computer, a server computer, variations thereof such as laptop computers and palmtop computers, and in some embodiments devices such as PDAs and smart phones. As shown in FIG. 2, a bus 210 couples one or more memory components 212 to one or more processors 214, various presentation components 216, input/output ports 218, input/output components 220, and at least one power supply 222. Other devices including lower level aspects of the shown devices are not shown so as to not obscure the invention.

Memory components 212 include things such as a hard drive, volatile memory (such as RAM), buffers, and the like. The one or more processors 214 control overall data communications throughout computing device 112. Illustrative presentation components 216 include a video card as well as a monitor or other presentation device. Input/output ports 218 provide connectivity to peripheral components such as printers, digital cameras, and the like. Actual input/output components may be things like printers and the like. A power supply 222 provides power to run computing device 112. Not all of the components shown in FIG. 2 need to be present in order to make up a computing device but are shown for illustrative purposes in connection with describing an embodiment of the invention.

Although the various blocks of FIG. 2 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. We recognize that such is the nature of the art and reiterate that the diagram of FIG. 2 is merely illustrative of an exemplary computing device that can be used in connection with one or more embodiments of the present invention.

Computing device 112 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; carrier wave; or any other medium that can be used to encode desired information and be accessed by computing device 112.

Returning to FIG. 1, computing device 112 is illustratively shown to be presenting a web page 114. By way of illustration, web page 114 will be discussed in connection with it presenting a set of search results. Although we make reference to "web page" 114, we mean to include within the scope of the claims any type of internet-provided media presentation. Examples of the same include items such as a face of an internet-connected watch, a video game console, or any other of a myriad of presentations. We will explain this aspect in greater detail as well as the fact that items such as consumer ratings, summary answers, and more are meant to be included within the scope of search results. Metadata 116 is shown as being associated with web page 114.

Although metadata 116 is being shown as associated with a page of search results, we mean to indicate that metadata might be associated with a specific web page as well as with specific objects on different web pages. Still further, meta data might include profile information stored on a server, user-profile information stored on client 112, including items such as language, location-based preferences and the like. By way of example, metadata might take the form of item-level metadata as well as object-level metadata. We do not mean for these terms to be terms of art. When we refer to item-level metadata, we are generally referring to metadata that is associated with items such as web pages and the like. Commonly, objects are presented on web pages. Illustrative objects include things such as products for sale, images, links, videos, mapping information, and the like. These individual objects might have metadata associated with them. For example, metadata might include a category, a price range, a brand, a product line, and the like. Some or all of the aforementioned examples might apply at the page level as well. That is, a web page might be associated with a specific category, or a price range of products, or a brand of merchandise, etc.

Computing device 112 is shown to be illustratively coupled to server (computing device, but referred to as a server for the sake of clarity) 118 by way of internet 120. Network 120 may not necessarily be the internet, but in one embodiment the internet is leveraged to help facilitate various functional aspects of an embodiment of the present invention. In other embodiments, what is labeled as internet 120 might actually be a private network as the case may be. Server 118 may actually be multiple servers. Throughout this disclosure we do not mean to imply by using the singular or the plural that only one or multiple servers are necessarily implicated. Rather, for the sake of expediency, we might refer to some items in the singular and other items in the plural, but unless specifically stated, we do not mean to imply that "a server" limits embodiments of our invention to only a single server. Often, multiple servers are employed for scalability purposes.

One role of server 118 is to help return search results incident to receiving a query from computing device 112. By way of example, a query 122 might be submitted from computing device 112 and arrive at server 118, which query is indicated by reference numeral 124. We do not mean to imply that query 124 is necessarily different than query 122, but as the case will be with referring to other items in this disclosure, we are working within the confines of a patent application. One of the aspects of a patent application is to be able to reference in the specification items and drawings. To this end, it is helpful to uniquely identify certain items in certain cases to enhance readability. Accordingly, we can eliminate confusion by referring to query 124 emerging from the internet by its own reference numeral.

As will be explained in greater detail below, server 118 leverages database 126 in one embodiment to provide search results 128. Database 126 can store multiple sets of data. For example, it might store query-related information 130 as well as aggregated user-interaction data 132, which includes metadata 134.

Query-related information 130 includes information related to a specific query that is provided from computing device 112. For example, a query might be "cheap digital cameras." In one embodiment, additional information might be associated with this query. We refer to this as query-related information, which in some embodiments, is used to provide search results 128. As we will explain, this query-related information 130 can transition from an initial state 136 to a subsequent state 138. As more user-interaction data 132 is received, query-related information 130 can progressively evolve over time. User-interaction data 132 refers to data gathered as users interact with search results 128 that are provided to client device 112, which search results are referenced by numeral 140, which might be identical to search results 128. Again, we use different reference numerals to make referencing easier.

As briefly mentioned, user-interaction data 132 includes an aggregate of user-information data across a populous. Thus, not only is user-interaction data 142 (which is data related to a user of client device 112 interaction with search results 140) provided, but if search result 140 is provided to other client devices (e.g., 144, 146, 148) then data gathered from their user interactions is also provided to database 126, which also stores, information about products, manufacturers, categories, prices, product lines and the like in one embodiment. We reference other user-interaction data by reference numerals 150, 152, and 154. Thus, as an entire populous of users interacts with search results that are returned incident to a submission of some query, that conglomeration of user-interaction data (142, 150, 152, 154) becomes aggregated user-information data 132.

Illustrative user-interaction data that is gathered includes click events, hover events, query abandonments, link avoidances, and dwell time as well as other actions such as such as bookmarking the page, forwarding to a friend, sending to mobile phone or other portable device, etc. Click events could include clicking on various objects in a web page or even not clicking on certain objects. Thus user-interaction data 132 could include information related to what links were not followed, especially if those links were intended to be monitored. Hover events include hovering a cursor such as a mouse pointer over certain words on a web page. For example, if a user hovers over a certain clause, then that can trigger a recording of that event. A query abandonment refers to a query that is deemed to have been abandoned by a user. Still further, interaction data can includes eye-tracking information as data related to user-frustration level.

By way of illustration, a user might submit a query, have a set of search results returned, and then not interact with those search results at all, or not within some period of time. Perhaps the user submits a search result, and then retires to bed for the evening. In some embodiments, user-interaction data is not associated with such a query if a user does not interact with the search results after some period of time, maybe 30 minutes, or some number of hours. A developer can decide. Link avoidances refer to links that were ignored by a user. Thus, as alluded to earlier, if a user does not engage or act on some link, then that omission can be logged as user-interaction data 132.

Dwell time refers to an amount of time between two events. This can help indicate an amount of time that a user dwells on a page or dwells doing some activity. By way of example, a user may click a first link, five minutes may lapse, and then a user clicks another link. Dwell time can be determined to be five minutes. In some embodiments, this metric is taken as indicating that a user spent five minutes reviewing data presented on some web page. The amount of weight that is given to each of these metrics might vary. For example, perhaps dwell time is discounted by some percentage to account for every day distractions. Perhaps clicking certain events is weighted more heavily than clicking other events.

To summarize so far, we have introduced an illustrative operating environment wherein a query 122 is submitted by computing device 112 that is received by server 118, which leverages database 126 to return search results 140. In leveraging database 126, server 118 references query-related information 130, which is gleaned from user-interaction data 132 including metadata 134. Metadata 134 is not limited to the search terms that make up query 122. Our invention capitalizes on learning information and gathering data that stems from a user interacting with search results. This can be contrasted with some prior-art technologies that concentrate more on the query instead of the results that stem from the query. For example, in some prior-art technologies, query 122 is analyzed to determine certain courses of action. This can result in a close-ended system, wherein search results that are returned are a function of an amount of data associated with the submitted query. But our invention is an open-ended solution whereby new data that might be associated with new search results is involved in a feedback loop so that query-related information can be continuously refined and perpetually updated to try to determine what a user who submitted a certain query was most interested in. In one way, our invention helps glean a user's intent that is associated with submitting some query.

In addition, an embodiment of our invention drives a system to adapt over time to fluid seasonal or changing cultural norms or biases. For example, whereas, a query on "portable music devices" might have returned results related to Sony Walkman® products twenty years ago, today, they might return results related to an Apple iPod® or Microsoft Zune® product. Still further, perhaps "costume" normally returns top results on jewelry, but by way of our invention, results related to wearable costumes begin to dominate during Halloween in the United States.

Figure 3:
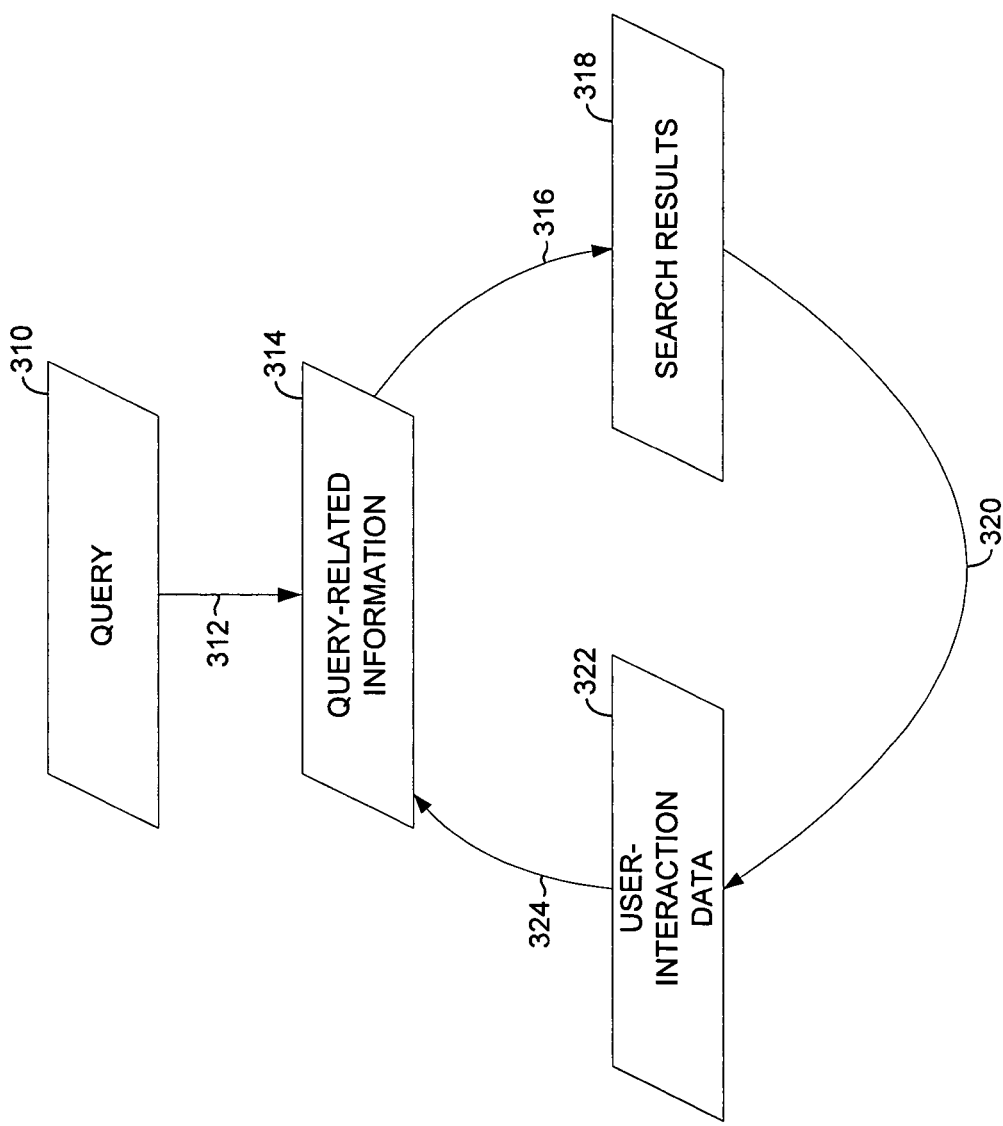
FIG. 3 depicts an illustrative flow diagram for determining search results based on a query.

Turning to FIG. 3, we present a high level flow diagram that helps describe an embodiment of determining search results based on some query 310. When query 310 is submitted by a client device, reference is made at a step 312 to query-related information 314. As briefly mentioned earlier, query-related information 314 is information that is related to query 310. This information might take the form of dominant metadata that is gleaned from pages and objects that a user interacts with incident to submitting query 310. We will explain what we refer to as "dominant metadata" later in this disclosure. Briefly, the more that certain items or objects are interacted with by way of search results that are returned, metadata associated with those items and objects is used to influence future search results.

Thus, at a step 316, query-related information 314 is used to help determine search results 318. After search results 318 are presented to a user, numeral 320 represents a step of tracking how users interact with those search results. As a user interacts with search results 318 (clicking on certain links, hovering over certain items, dwelling on certain pages, opening certain text boxes, etc.) data associated with the user's interactions are logged. This gives rise to user-interaction data 322. User-interaction data 322 is, as mentioned, related to various types of actions that a user takes in connection with the search results presented. This information is used at a step 324 to update query-related information 314. Thus, query-related information 314 is updated based on user-interaction data 322.

With query-related information 314 now updated, it is possible that search results 318 might be different than an initial set of search results that was presented prior to an updating of query-related information 314. The ways in which search results 318 might differ include rankings as well as descriptions of either pages or objects. If people tend to interact or seek a specific item of information after receiving back search results incident to receiving a query, then an embodiment of our invention will enable that sought-after information to bubble to the top so that subsequent search results will reflect previous users' desire for the sought-after information. Further, an embodiment of the invention helps map a semantic meaning of the query to results that bring about a satisfying user experience.

To help understand various concepts of embodiments of our invention, we will now provide some more specific examples. But we do not intend for these examples to limit our invention. Embodiments of our invention provide, among other things, a feedback loop wherein users' interactions with search results are used to determine subsequent search results based on even identical queries. On the other hand, embodiments of our invention make possible the implication of interaction data to related queries, which are not identical. Maybe it's the case the case that when people search on "tents" they tend to migrate to the same information that was pretend in connection with "camping." If so, when one queries on "tents," the UID stemming from interacting with search results of "camping" will be leveraged.

Figure 4:
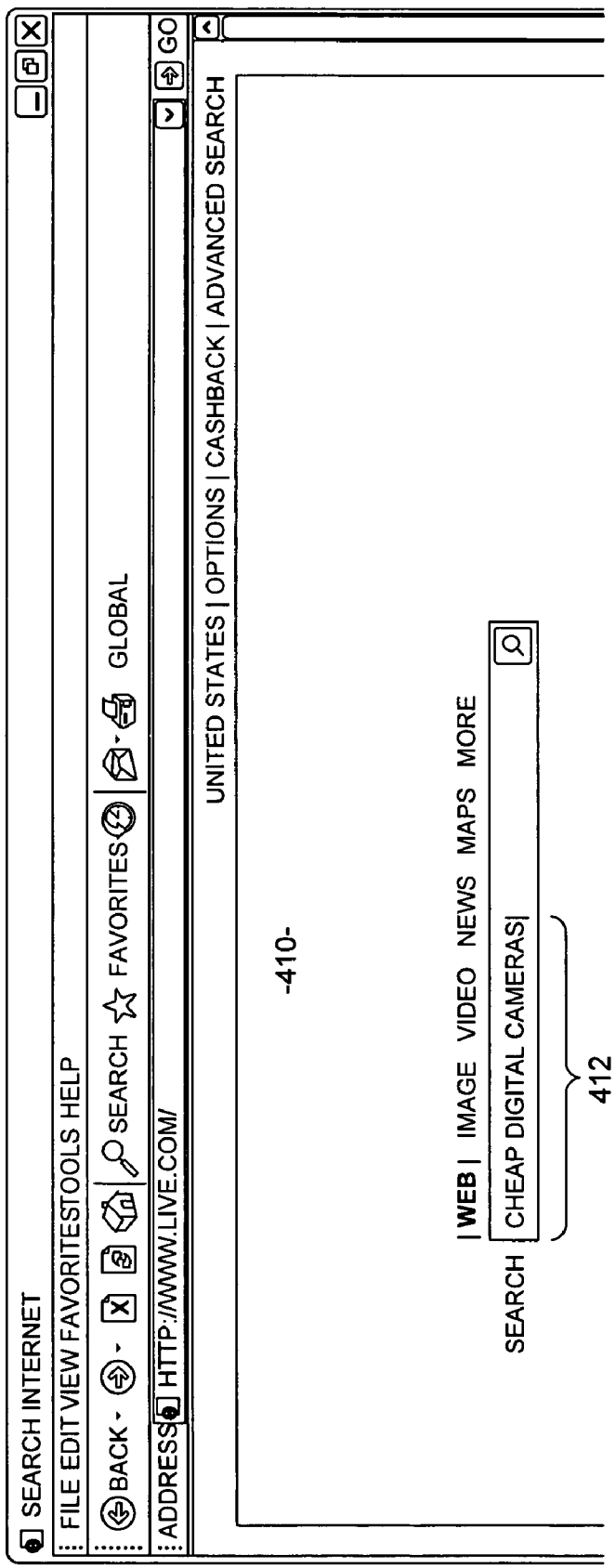

Turning now to FIG. 4, we show an illustrative web page 410, which includes an ability to submit a query 412, which in this case is "cheap digital cameras." Suppose that an initial set of search results are presented incident to submission of query 412. These search results might take the form of web page 500 depicted in FIG. 5.

Web page 500 represents an illustrative embodiment of search results that are returned incident to submitting query 510, which is the same as query 512 in this example. Web page 500 includes a variety of objects including items for sale, links to other items, and more. Categories of products are referenced by numeral 512. For example, two illustrative categories include "digital cameras" 516 as well as "carrying cases" 518. Parenthetical numbers indicate a number of items in each category. For example, we illustratively show 2686 objects in the "digital cameras" category 516. Products for sale are also shown, and referenced by numeral 514.

Although we refer to products as being "for sale," we do not mean to necessarily imply that they require monies to purchase. For example, freeware or shareware might be free of charge, but a depiction of such items is intended to be included within the scope of this disclosure and where appropriate, the claims below. An illustrative item is denoted by reference numeral 520, a "Cannon PowerShot" camera. There might be metadata associated with this item 520. The metadata is referenced by numeral 522. Here, we see an example of object-level metadata. Metadata 522 represents metadata associated with a given object. This object might be associated with a certain category, a price range, a product line, and/or a brand. This is illustrative metadata that might be stored to make up metadata 134 in FIG. 1. Similarly, we denote by reference numeral 524 metadata associated with web page 500. Web page 500 itself might be associated with category information. For example, the various items 514 might be items in a specific category. Metadata 524 might include product information, wherein the various products listed on web page 500 are of a common sort. Metadata 524, even at the page level, might indicate a price range associated with objects that are presented by way of the web page.

For purposes of this example, let us assume that a user would like to drill down to within some category to view the objects in that category. Let us assume for purposes of an illustrative example, that a user is interested in carrying cases. For purposes of this example, following a link 518 that denotes carrying case, a user might be presented with a web page 600 as shown in FIG. 6.

Figure 6:
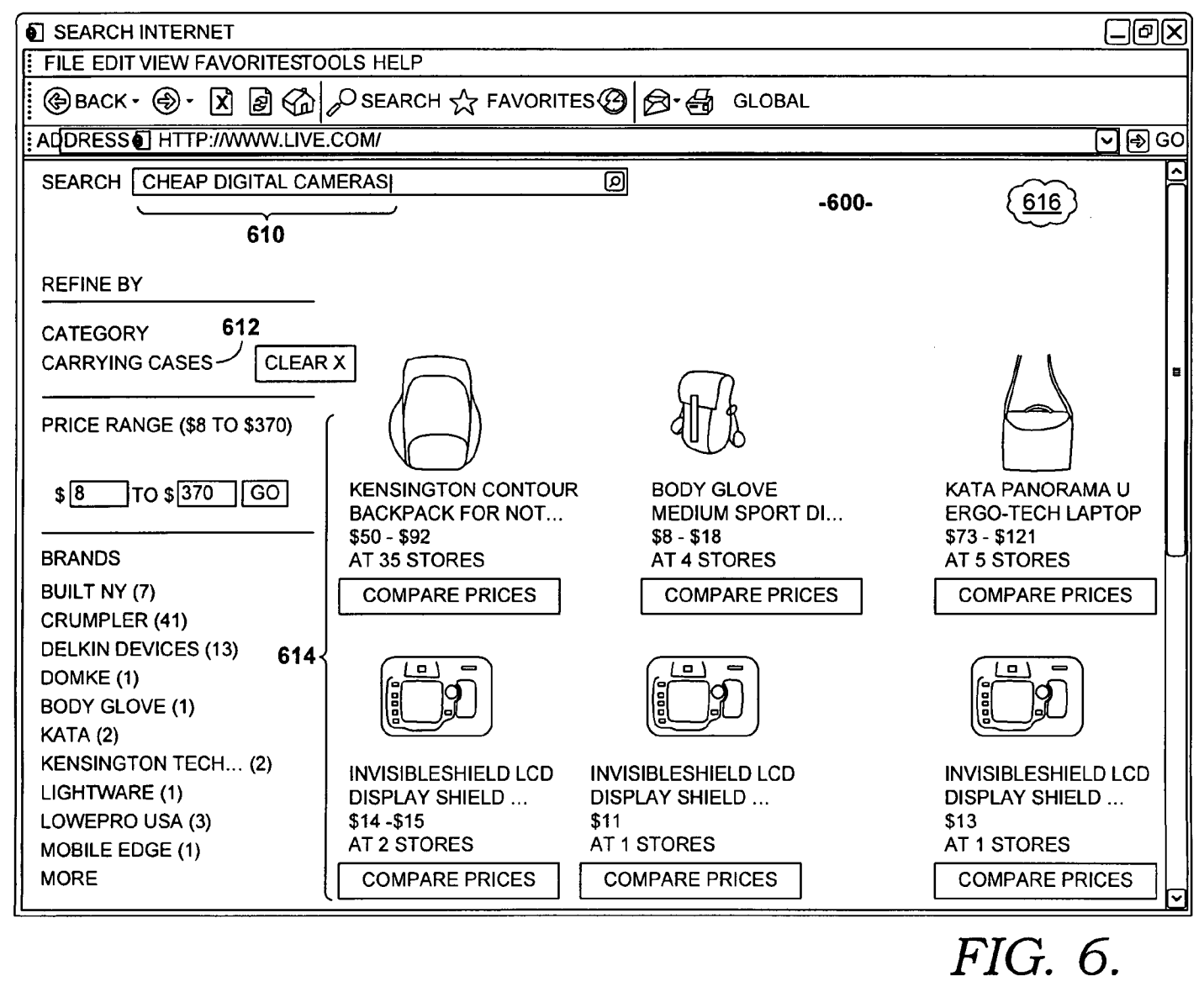

Turning now to FIG. 6, an illustrative web page 600 shows various items 614 that are in the category "carrying cases," which is represented by numeral 612. Recall, these results ultimately might have stemmed from query 610, which is the same as query 412 from FIG. 4 and 510 from FIG. 5 in some embodiments. According to an embodiment of our invention, the users clicking the "carrying case" link 518 would be logged. If a user dwells on web page 600 for a certain amount of time, then that dwell time might be recorded. If a user hovers over some of the different objects presented by way of web page 600, then that user-interaction data could be logged. Metadata associated with web page 600 (shown by reference numeral 616) could be logged. Metadata associated with individual objects from the group of objects 614 could be logged. Price information, category information, brand information, product-line information, etc., could be logged.

Other data could also be logged, such as user-centric and session-centric information. By way of example, a user identifier associated with a photography group could be logged, or interested indicated by a blog; or even language-related information—such as the fact that a user in a first country has his or her language set to something other than a native tongue.

Figure 5:
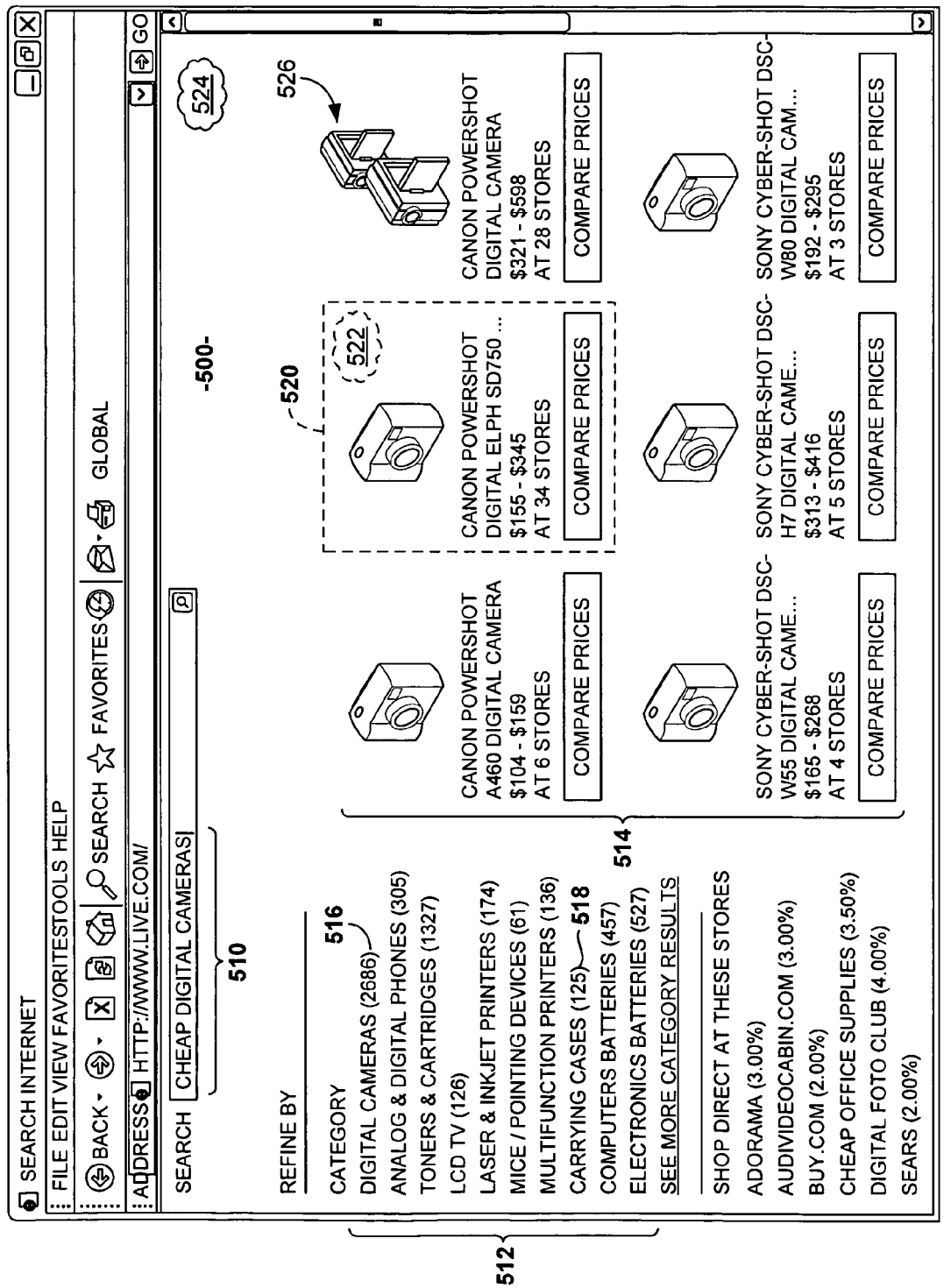

The options for storing different types of metadata are legion. Even trying to list them all would almost be fruitless because the options and variances are so great. Whatever an implementer can set up as metadata is useable to qualify future results. For example, let us assume that almost every time a user submits query 610, "cheap digital cameras," users select "carrying case" as their first click. If enough people do this, then instead of carrying cases category 518 remaining relatively low on the list 512 as it is shown in FIG. 5, it may bubble to the top as shown in FIG. 7. By way of another illustration, perhaps it might be determined that cheap digital cameras implies that users are searching for a case, so results are filtered by that attribute/product type. Turning now to FIG. 7, a web page 700 is presented along with a listing of category items 710. But note, "carrying cases" link 712 has bubbled to almost the top of the list 710 as opposed to being low on list 512. This is an illustrative example of how a ranking of search results might be varied according to a conglomeration of user-interaction data that is gathered incident to an initial presentation 500 of search results.

Figure 8:

Suppose further that users begin at page 500 and progressively click and hover and scroll and in other ways interact with the initial set of search results that were presented to them; and in so doing, they ultimately trend toward a new category that is not in list 512 at all. Suppose this new category is "telescope cameras." As shown in FIG. 8, web page 800 includes a list 810 that includes a new category, "telescope cameras" 812. What has happened, is that a new category has appeared in list 512 based on various users' interactions with an initial listing of search results 512.

The illustration above indicates an example of the open-endedness of our invention. Recall that we briefly alluded to some prior-art technologies that might utilize items such as classifiers that analyze the search query itself. Perhaps categories are defined based on certain search terms or queries. Maybe certain brands are defined. This happens in advance of receiving user queries. If a new brand or a new category appears on the internet, and prior-art techniques were employed, that new brand or new category would never be presented to a user. But embodiments of our invention allow for analysis of search results, including metadata associated with the search results so that as new items and new objects surface on the internet, those too can be used to influence subsequent search results.

Figure 9:
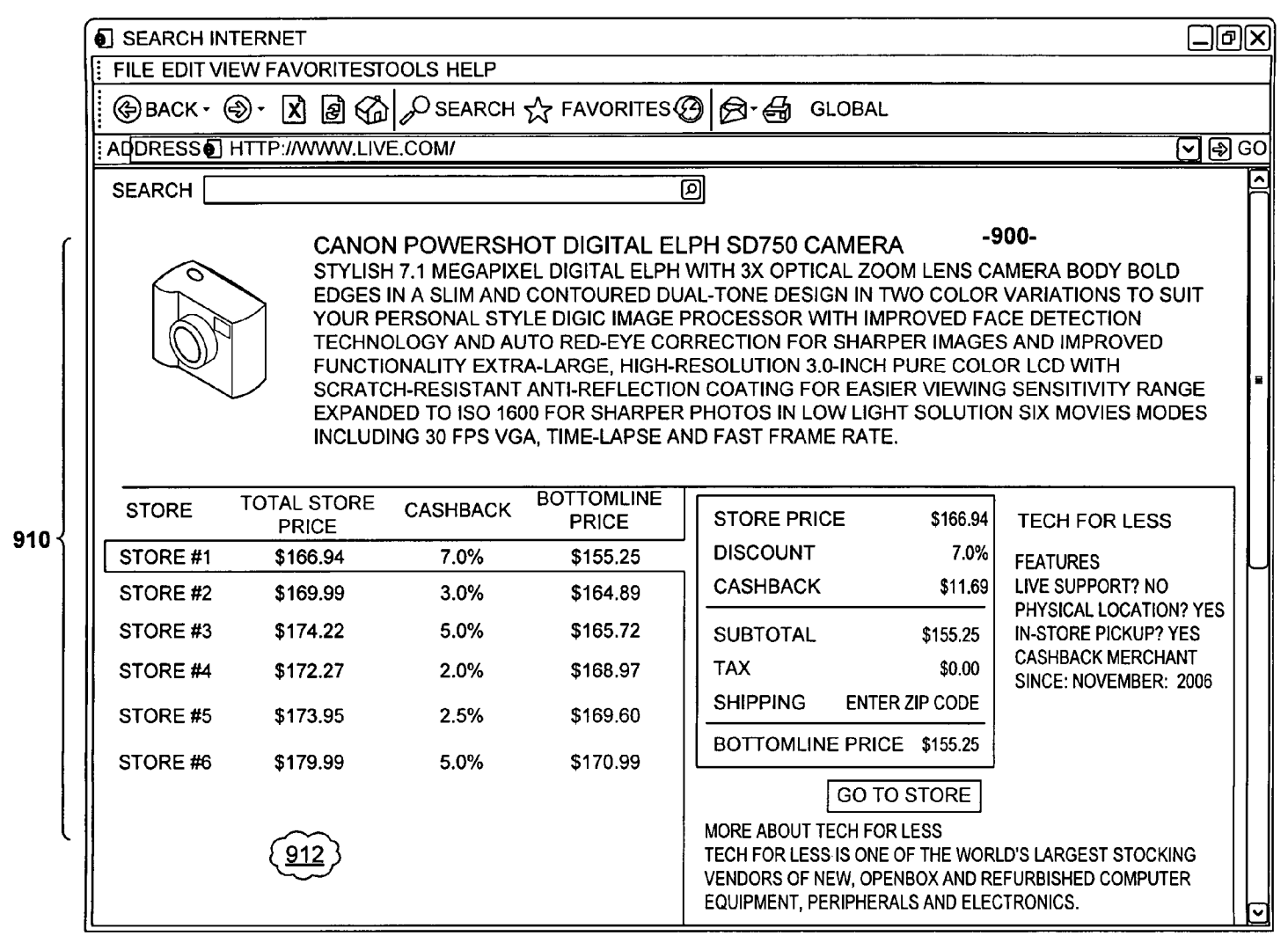

With brief reference back to FIG. 5, presume that a user clicks on item 520. Doing so might present a page such as web page 900, which is illustratively shown in FIG. 9. An array of information 910 is presented to a user. The user action of clicking link 520 from FIG. 5 to get to web page 900 might be logged and stored as user-interaction data. Similarly, as a user interacts with the different objects shown on web page 900, the metadata associated with those objects, generally referenced by numeral 912 can be gathered and stored in a data store, such as database 126, which of course, might be many tens or hundreds of databases. Metadata associated with each individual item or store could be gathered. In one embodiment, this information can be used to glean user intent. That is, by way of example, at least a perceived user's intent can be gleaned from the query "cheap digital cameras," such that it is assumed that when a user searches on "cheap digital cameras," they really mean digital cameras between $155-$345.

Things might go the other way as well. For example, perhaps people are more interested in cameras in a range from $321-$598. If enough people acted on that price range 526, then objects in that price range might be presented first, which we show in FIG. 10.

Figure 10:
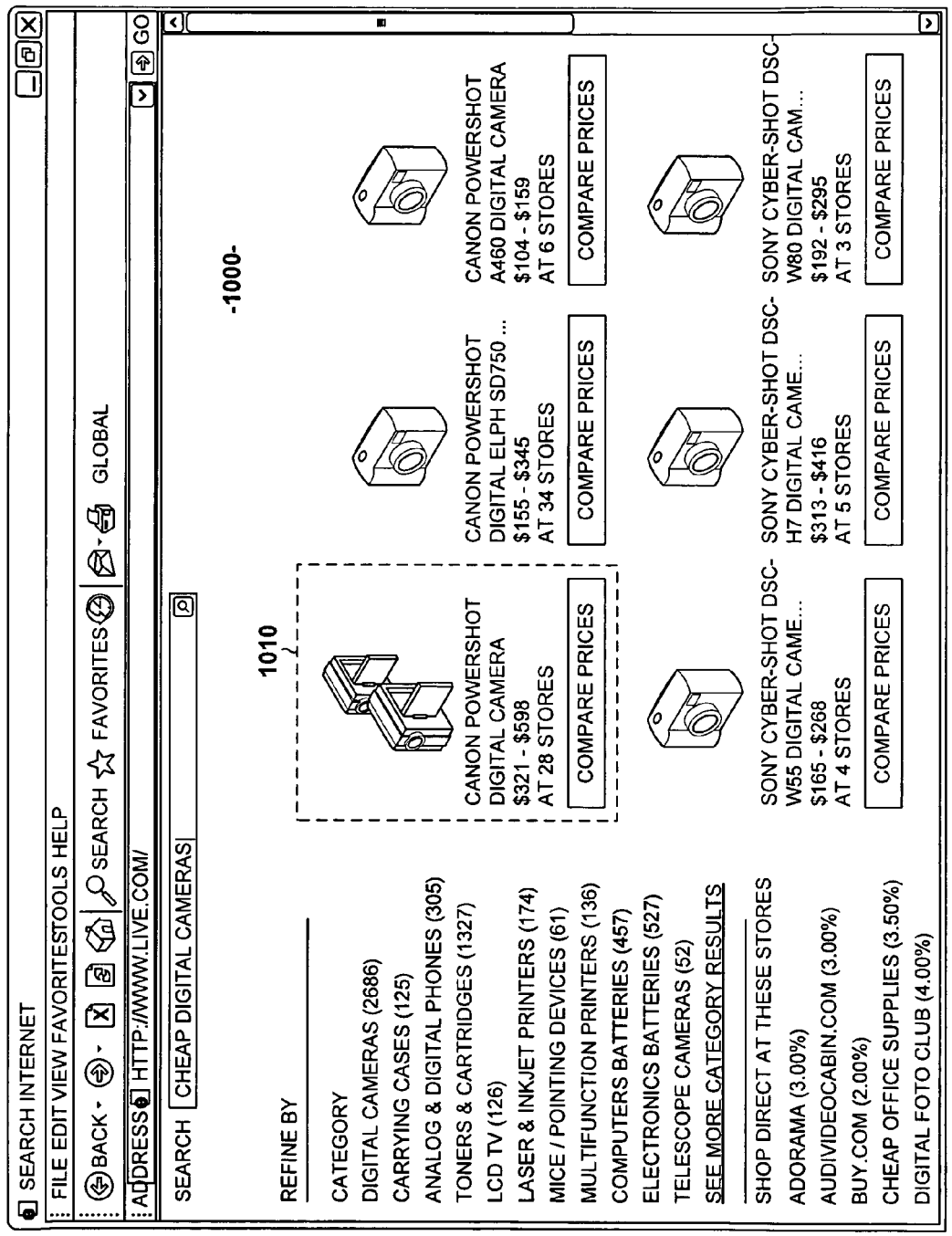
Figure 11:
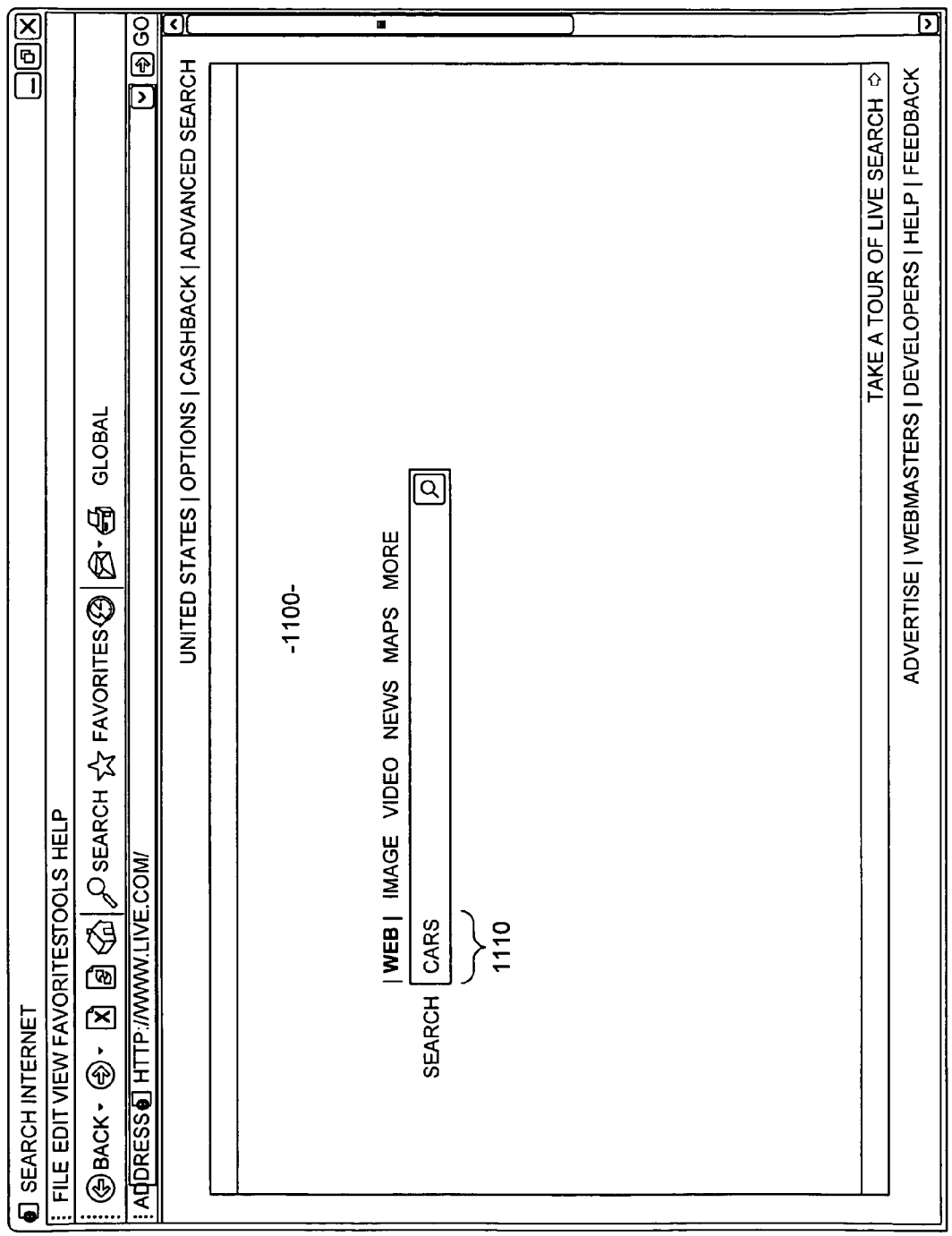

Turning now to FIG. 10, a web page 1000 indicates that item 1010 (which reflects objects in a price range of $321-$598) has been moved to the front of the list of items referenced by numeral 514 in FIG. 5. In one embodiment, this would have occurred because the metadata associated with acting on item 526 would have been fed back into database 126 so that query-related information 130 is modified so that the given price range is associated with search query 412. Turning now to FIG. 11, we show another web page 1100 that can receive a query 1110, which in this case is "cars." Submitting such a query might return the information presented on web page 1200 of FIG. 12.

Figure 12:
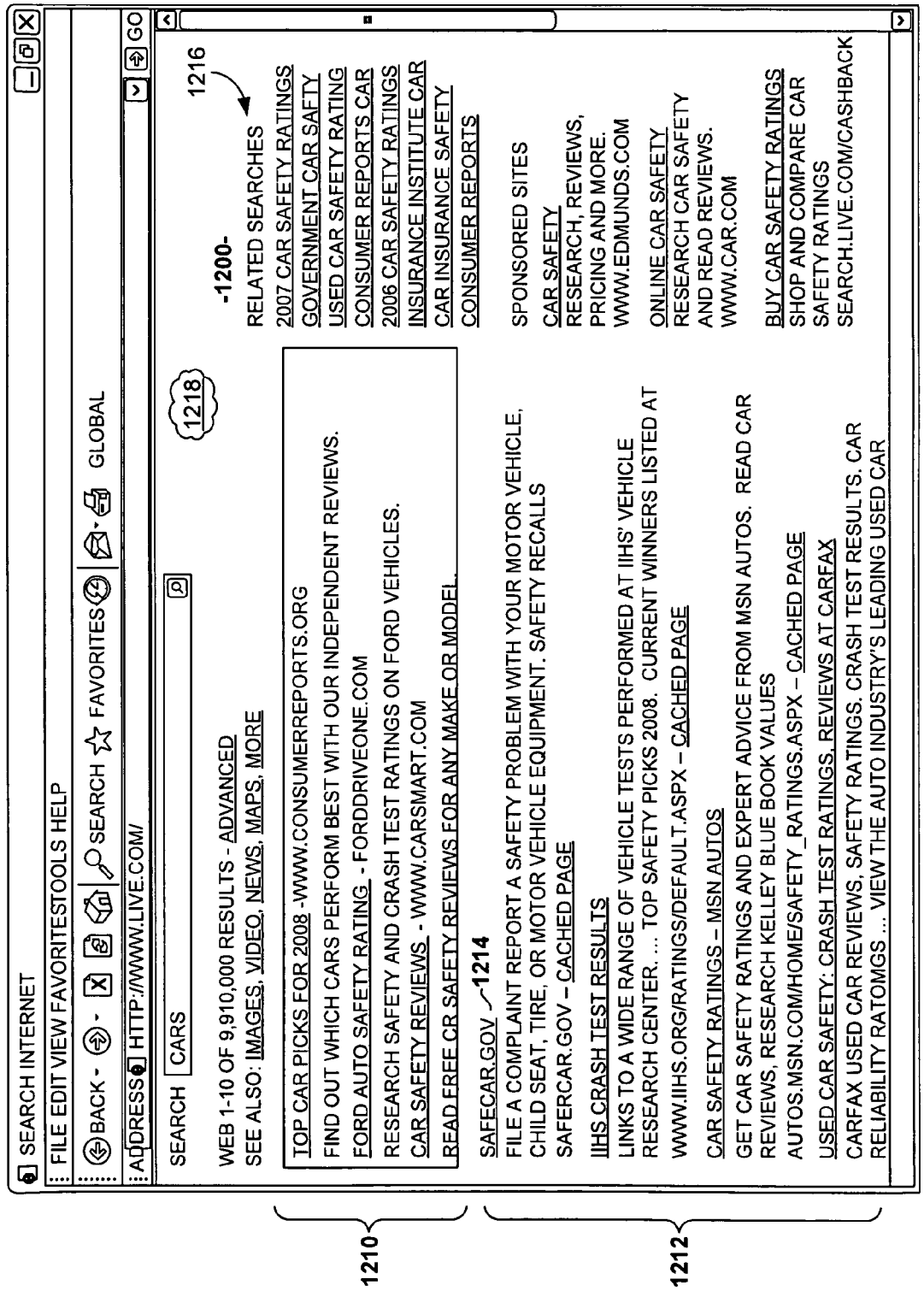

Turning to FIG. 12, the first portion of information 1210 is presented as well as a second portion of information 1212. In some embodiments, one or the other portions of information might be shown. In still other embodiments, additional information might be shown such as information referenced by numeral 1216. In one embodiment, information portion 1210 shows items such as ratings information or reviews or the like. Information 1212 might show a series of links that are at least initially associated with query 1110. One embodiment of the invention can influence what is shown in either or both information portions 1210 and 1212. For example, if enough users indicate by their actions that they are interested in crash-test ratings incident to submitting a query on "cars," then car-safety ratings can be included in information portion 1210. Again, this can gleaned from the metadata associated with the page, which here is represented by numeral 1218. Storing the metadata in a data store, and making that data available and usable to condition subsequent search results is at least one novel aspect of the present invention.

Figure 13:
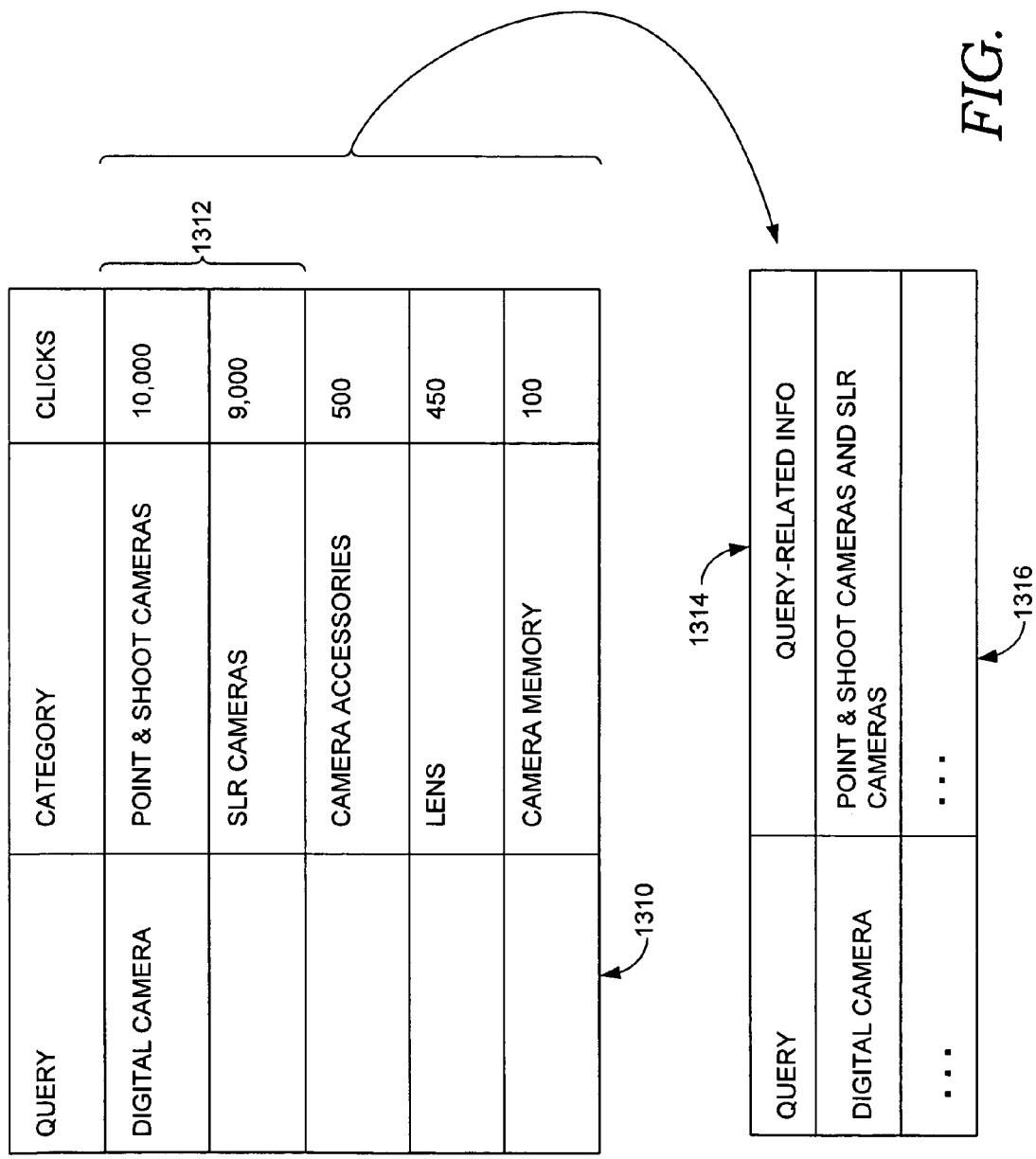
FIG. 13 depicts illustrative user-information data as well as a mapping of a query to query-related information according to an embodiment of the present invention.

Turning now to FIG. 13, illustrative user-interaction data 1310 is shown. Table 1310 indicates that as people submit the query "digital camera," various categories of results are interacted with by users. Two main categories appear to be interacted with more than the others. These two categories are referenced by numeral 1312, and illustrate one example of dominant metadata. Dominant metadata can include metadata associated with items or objects that are more frequently interacted with than other items or objects. For example, "point & shoot cameras" and "SLR cameras" account for 19,000 clicks of an approximate and illustrative 20,500 clicks. Accordingly, this dominant metadata 1312 is used to generate query-related information, which is represented by column 1314 of table 1316. This table maps the query "digital camera" to query-related information "point & shoot cameras and SLR cameras." Thus, in one embodiment, when a user searches on "digital camera," search results that are associated with point & shoot cameras and SLR cameras will be presented to a user. This example illustrates one way of gleaning user intent associated with a given query. For example, it can be determined that users actually intend to receive search results based on point & shoot cameras and SLR cameras when they provide the search term "digital camera."

Figure 14:
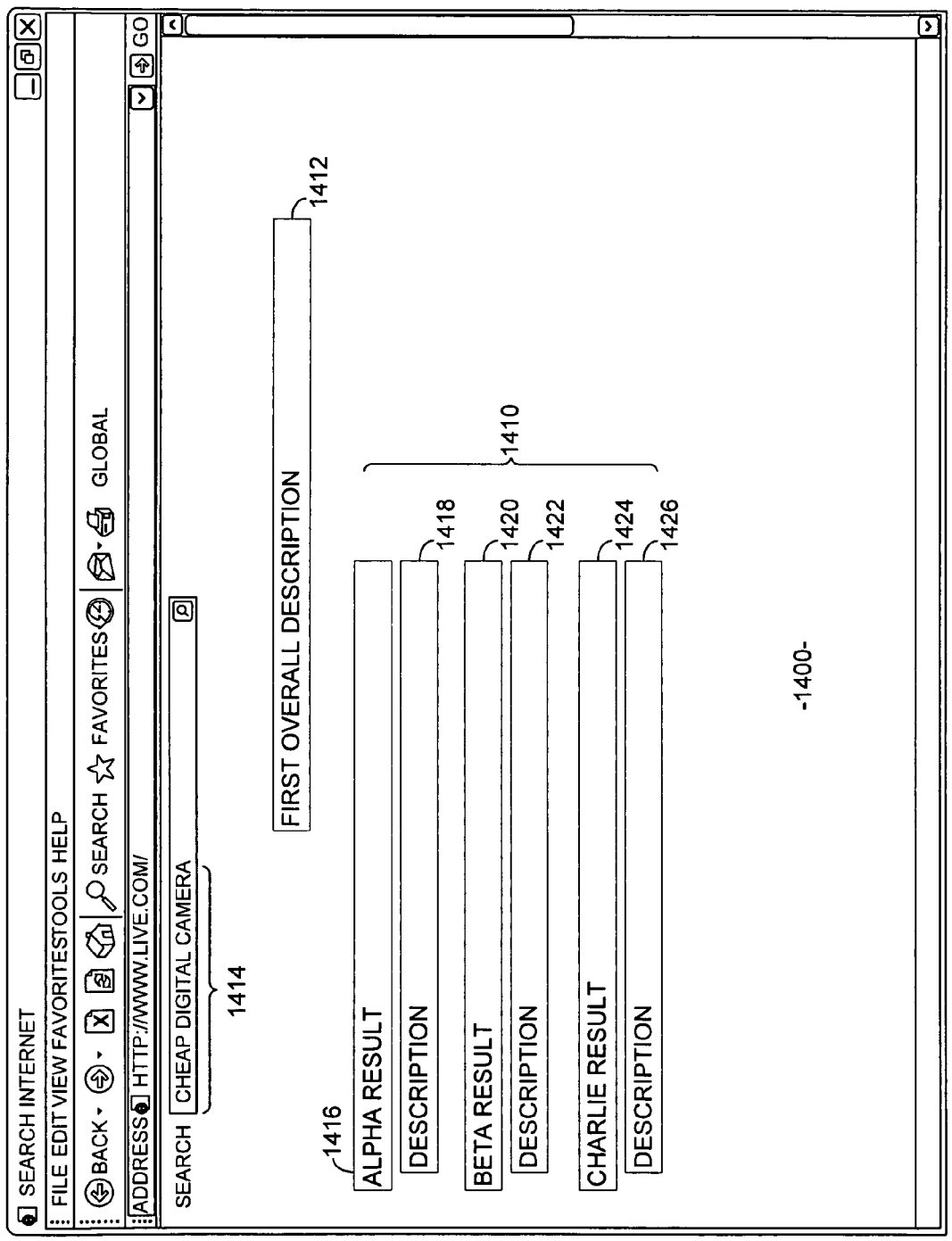
FIGS. 14-17 depict illustrative representations of varying rankings, descriptions, and summary information based on user-interaction data according to an embodiment of the present invention.

Turning now to FIG. 14, a web page 1400 depicts a set of search results 1410. In one embodiment a first overall description 1412 describes search results 1410, which were returned from a search query 1414. As shown, three results and three descriptions are presented including an Alpha result 1416 that appears first along with a corresponding description 1418; a Beta result 1420 along with a corresponding description 1422 as well as a Charlie result 1424 and a corresponding description 1426. It should be clear from our use of generic terms such as "Alpha"-"Charlie" that we do not mean to implicate any specific type of search results, only that there might be some initial set of search results 1410. But based on metadata associated with links 1410 that are interacted with by users, the order may change.

Figure 15:
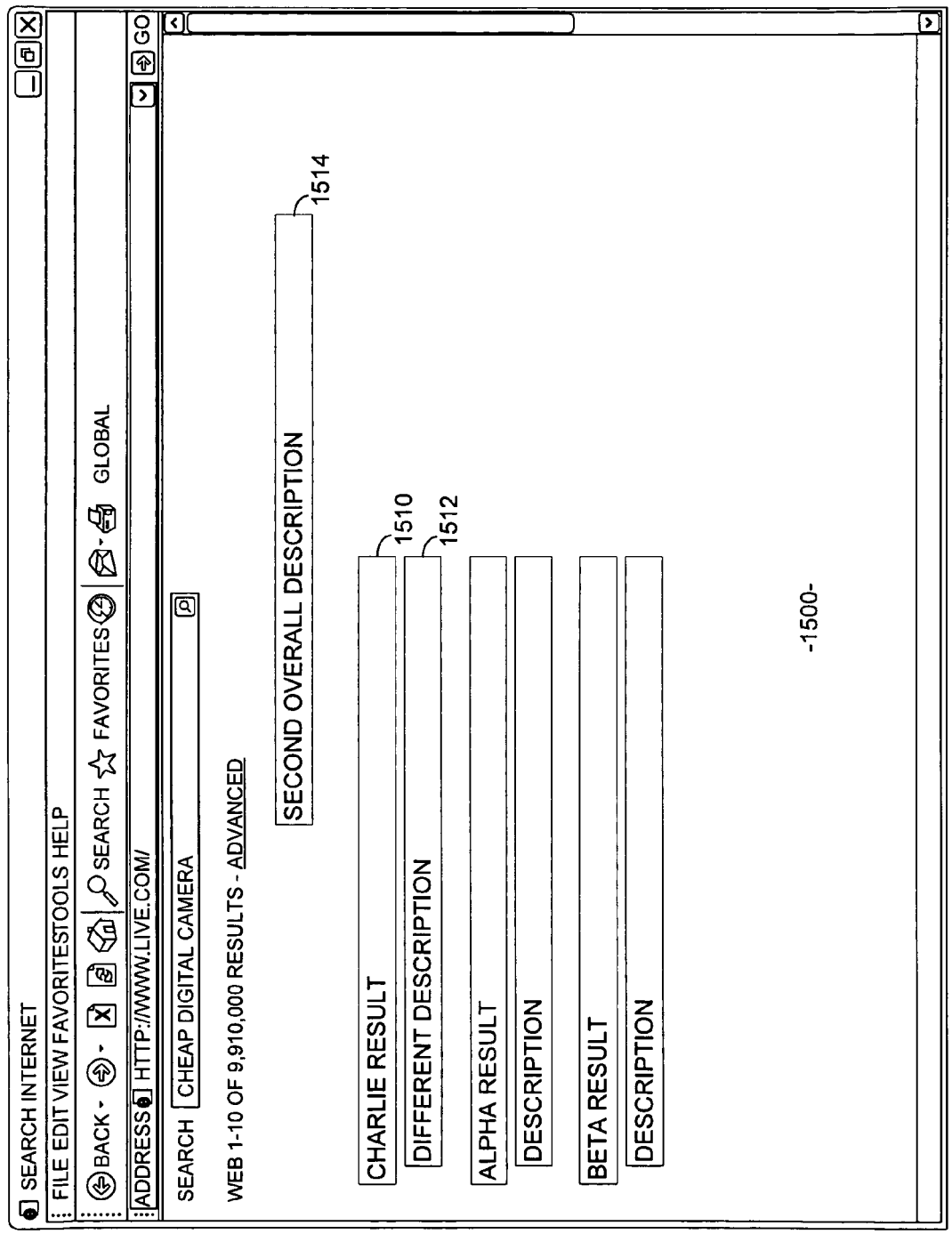

For example, with reference to FIG. 15, a web page 1500 shows that Charlie result 1510 has bubbled to the top in comparison with list 1410. Similarly, a different description 1512 is now shown in connection with Charlie result 1510. This different description 1512 is different from that of 1426 in FIG. 14. It is different because Charlie result itself might be different. In some embodiments, Charlie result is the same. In other embodiments, the third result might be described differently even if it is the same result. For example, an initial description might have been "Acme cameras." But if enough users interact with cameras less than $300, then different description 1512 might become "Acme cameras less than $300." Similarly, a second overall description 1514 might be different than first overall description 1412. That is, the first overall description that described the search results 1410 might change if the search results change namely as a result of users interacting with search results. This might lead to an overall change in the description of the search results.

Figure 16:
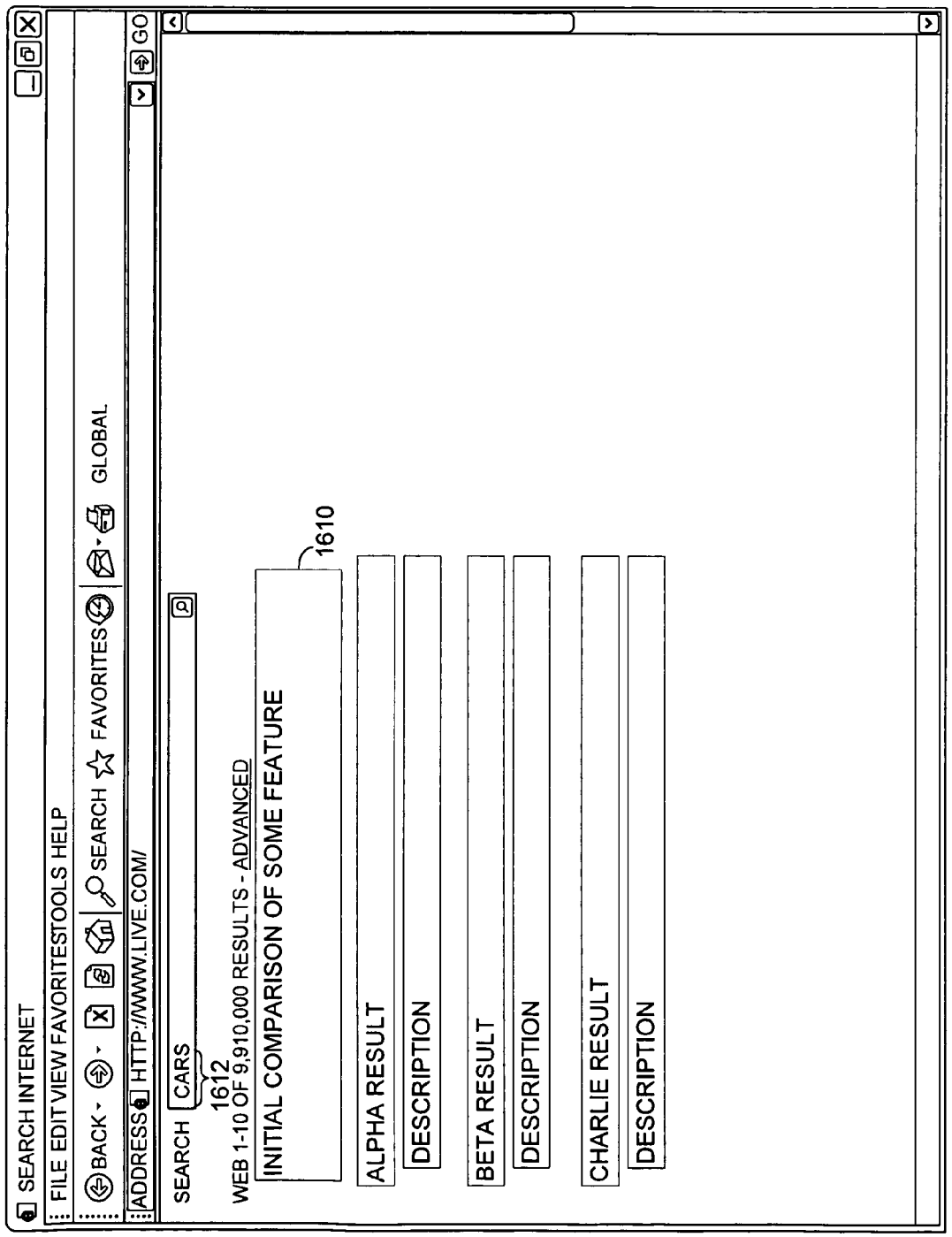
Figure 17:
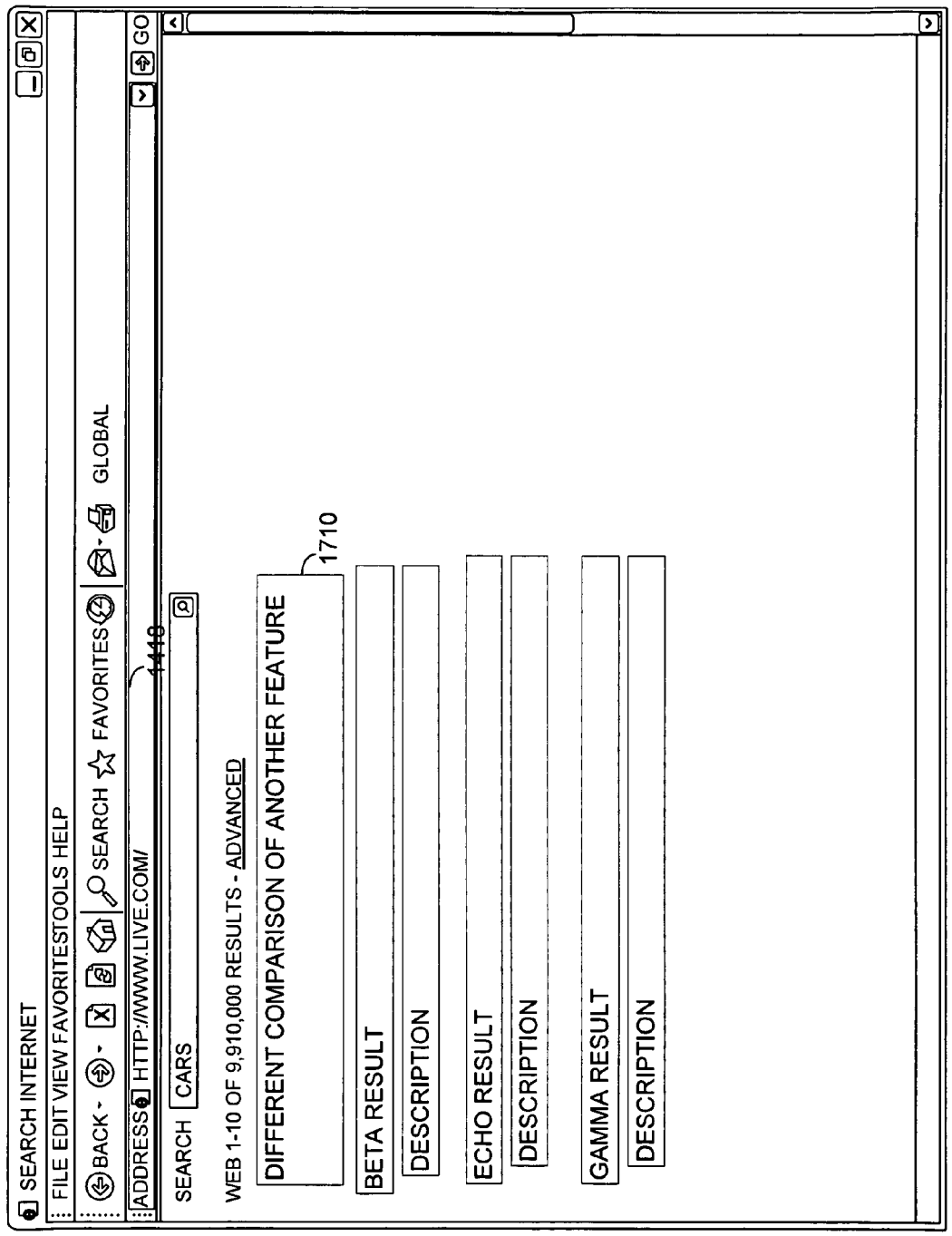

FIG. 16 depicts an initial comparison of some feature 1610. Perhaps the initial comparison compares the feature gas mileage. But if enough people, when searching on "cars" 1612 click through to seek out information related to crash tests, then initial comparison 1610 might give way to a different comparison of another feature 1710 as shown in FIG. 17. Comparison 1710 might compare safety ratings instead of gas mileage because more people click on items that are associated with metadata that describe safety information instead of gas-mileage information.

Figure 18:
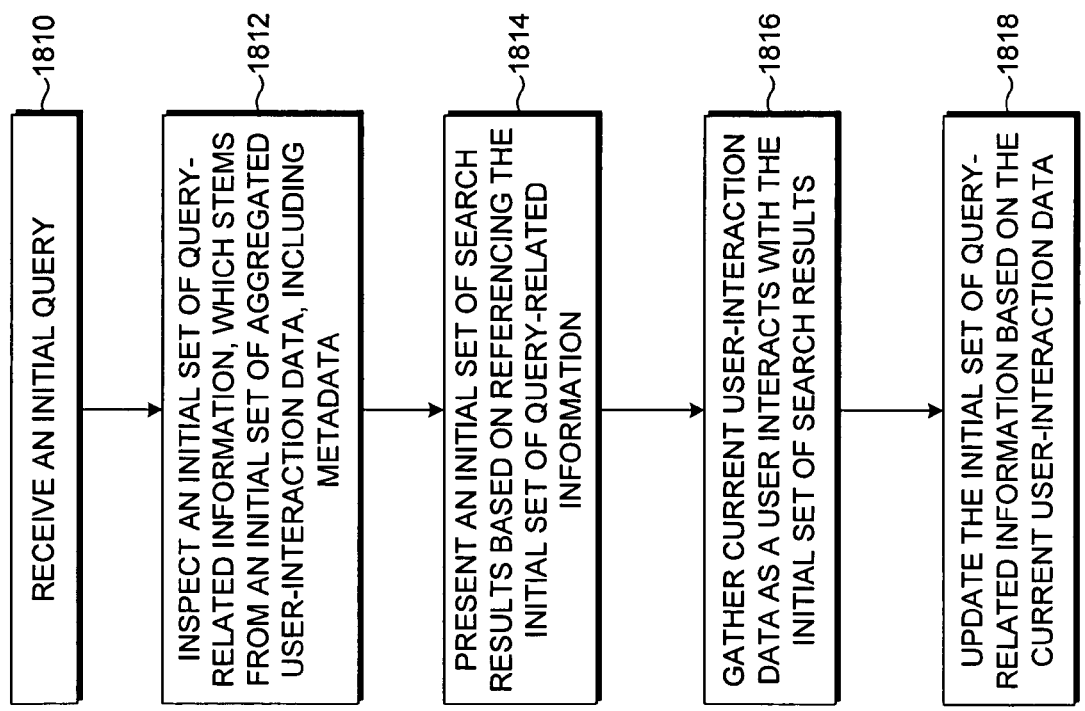

Turning now to FIG. 18, we provide another flow diagram of an illustrative method of determining search results based on a query. At a step 1810, an initial query is received. At a step 1812, that query causes an inspection of some initial set of query-related information, which stems from an initial set of aggregated user-interaction data. By way of example, after receiving an initial query at a step 1810, inspection might be made of initial query-related information 136. Initial query-related information 136 would have been gleaned from the metadata associated with objects that users interacted with after receiving back some set of search results.

At a step 1814, an initial set of search results is presented on computing device 112. This initial set of search results is based on referencing the initial set of query-related information 136. At a step 1816, user-interaction data is gathered as a user interacts with the initial set of search results. The current user-interaction data includes current metadata associated with at least a portion of the search results. As mentioned, this metadata might be at the page level, object level, or a combination thereof. At a step 1818, the initial set of query-related information 136 is updated based on current user-interaction dated (such as 142, 150, 152, 154). This would produce a subsequent set of query-related information, which is referenced by numeral 138 in FIG. 1. This updated query-related information is useable to return a subsequent set of search results incident to receiving a subsequent query and might even be the same as the initial query received. The initial set of search results might include a first listing of items in some order, which might include a first set of descriptions. But subsequent listings might be in a different order and/or they might include different descriptions based on the received user-interaction data.

Turning now to FIG. 19, another illustrative method for determining search results based on some query is provided. At a step 1910, an initial set of search results is presented incident to receiving some query. The search results include a listing of items related to the query in one embodiment. The items, if acted on, might present objects, which illustratively include one or more products or links to other items. Thus, in one embodiment, items might include web pages, and objects include things presented on those web pages.

At a step 1912, user-interaction data is tracked as a user interacts with the search results. This user-interaction data includes processed metadata, which includes metadata at an item level and/or an object level. Thus, metadata associated with a web page might be gathered, and/or metadata associated with objects of the web page might be gathered. At a step 1914, this user-interaction data is stored in a data store.

Step 1916 reflects basing subsequent search results on the user-interaction data including the metadata. That is, the metadata that is stored is used to influence subsequent search results. The illustrative ways in which search results can be influenced includes varying at least one of a ranking and/or a description of the later search results when presented incident to receiving another query that might be identical to the first query.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention.

It will be understood that certain features and subcombinations are of utility and may be employed without reference to other features and subcombinations and are contemplated within the scope of the claims. Not all steps listed in the various figures need be carried out in the certain order described.

The invention claimed is:

1. A computer-implemented method of determining search results based on a query, the method capable of being performed by a computing device that has access to one or more memory components, and the method comprising:
receiving an initial query;
inspecting an initial set of query-related information that is associated with the initial query, the initial set of query-related information stemming from an initial set of aggregated user-interaction data, wherein the initial set of aggregated user-interaction data reflects interactions by many users and how the many users have previously interacted with former search results that were presented in response to the initial query, which information includes prior metadata associated with the former search results;
presenting an initial set of search results based on referencing the initial set of query-related information, wherein the initial set of search results includes a first listing of a plurality of items in a first order, which items include first descriptions;
gathering current user-interaction data as a user interacts with the initial set of search results, the current user-interaction data including current metadata associated with at least a portion of the search results;

updating the initial set of query-related information based on the current user-interaction data, thereby providing updated query-related information; and presenting a subsequent set of search results incident to receiving a subsequent query that is the same as the initial query, wherein the subsequent set of search results is based on referencing the updated query-related information, wherein presenting the subsequent set of search results includes presenting a second listing of a plurality of items in a different order from the first order, said different order based on the updated query-related information, and further wherein second descriptions are presented in connection with the second listing of the plurality of items, wherein the second descriptions are different from the first descriptions, and wherein the second descriptions are based on the updated query-related information.

2. The method of claim 1, wherein inspecting an initial set of query related information that is associated with the query includes inspecting an initial set of query related information that is associated with similar queries, said similar queries being identified by similarity of search results interacted with.

3. The method of claim 1, wherein presenting the initial set of search results includes presenting one or more of:
   a first summary of a first feature related to the initial query; and
   a first ratings depiction that depicts ratings associated with the initial query.

4. The method of claim 1, wherein gathering current user information includes monitoring user events as a user interacts with the initial set of search results, and wherein the user events include one or more of:
   click events,
   hover events,
   query abandonment,
   link avoidances, and
   dwell time.

5. The method of claim 4, wherein the metadata includes metadata of the items as well as objects associated with the items.

6. The method of claim 5, wherein the items include user interfaces, which includes web pages, and the items include one or more of the following such that metadata of web pages is gatherable as well as metadata associated with objects presented via the user interfaces:
   documents,
   images,
   mapping information,
   videos; and
   products for sale.

7. The method of claim 6, wherein the metadata includes data related to one or more of brand, category, product line, and price.

8. The method of claim 1, wherein presenting the subsequent set of search results includes identifying dominant metadata within the updated query-related information, wherein the dominant metadata is metadata associated with items that are interacted with at a relatively higher rate than other items.

9. The method of claim 8, further comprising varying a presentation of the items on the web pages based on the updated query-related information.

10. One or more computer-readable media having computer-executable instructions embodied thereon for performing a method of determining search results based on a first query, the method comprising:

presenting a first set of search results incident to receiving the first query, the first set of search results including a first listing of items related to the query, the first listing of items in a first order and including first descriptions, wherein the items, if acted on, present objects, which objects include one or more products or links to other items;

tracking user-interaction data as a user interacts with the first set of search results, wherein the user-interaction data includes click events, hover events, query abandonment, link avoidances, and dwell time, and further wherein the user-interaction data includes metadata, which metadata includes at least one of
(1) item-level metadata, or
(2) object-level metadata;

storing the user-interaction data in a data store; and incident to receiving another query that is the same as the first query, presenting a subsequent set of search results based on the user-interaction data, including the metadata, such that the metadata influences a ranking and a description of the subsequent set of search results, wherein influencing a ranking comprises presenting a second listing of a items in a different order from the first order, said different order based on the user-interaction data, and further wherein second descriptions are presented in connection with the second listing of items, wherein the second descriptions are different from the first descriptions, and wherein the second descriptions are based on the user-interaction data.

11. The media of claim 10, wherein the items include one or more of:
   web pages;
   summary results; and
   rankings.

12. The media of claim 11, wherein the metadata includes one or more of:
   a category;
   a product line;
   a price range; and
   a brand.

13. The media of claim 10, wherein basing later search results on the user-interaction data includes identifying dominant metadata from the processed metadata, wherein the dominant metadata is metadata related to items or objects that were interacted with by a user relatively more frequently than other items or objects.

14. A system for determining search results based on a first query, the system comprising:
   a first computing device that receives queries and facilitates presentation of current search results in connection with the received queries; and
   a data store coupled to the first computing device that stores metadata gathered from prior instances of users interacting with prior search results presented incident to receiving previous queries that were the same as the received queries, such that the metadata is useable to provide query-related information, which is useable to determine:
   (1) a ranking of subsequent search results,
   (2) a description corresponding to the subsequent search results,
   (3) an intent associated with the query, and
   (4) a context of the query;
   wherein the first computing device facilitates presentation of the current search results by referencing the data store for metadata gathered from prior instances of users interacting with prior search results presented incident to receiving previous queries that were the same as the received queries, and further wherein the current search results are presented in a different order and with different descriptions than previously presented with in the prior search results, wherein the different order and different descriptions are based on the metadata gathered from prior instances of users interacting with prior search results presented incident to receiving previous queries that were the same as the received queries.

15. The system of claim 14, wherein the metadata includes information related to one or more of:
   a brand of one or more objects;
   a category of one or more objects; and
   a price range of one or more objects.

* * * * *